Dec. 11, 1956 W. D. CALVERT 2,773,326
FOLDABLE TILT-UP
Filed Sept. 9, 1953 2 Sheets-Sheet 1

INVENTOR
WARREN D. CALVERT
BY
McMorrow, Berman & Davidson
ATTORNEYS

Dec. 11, 1956  W. D. CALVERT  2,773,326
FOLDABLE TILT-UP
Filed Sept. 9, 1953  2 Sheets-Sheet 2
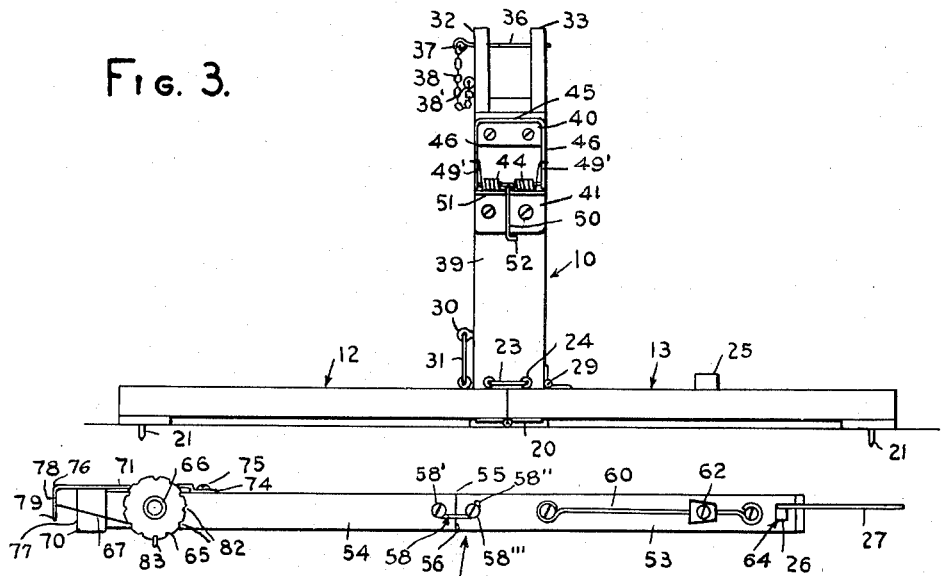
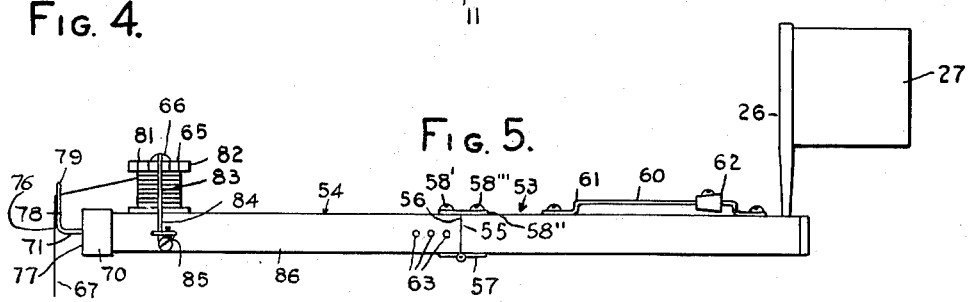
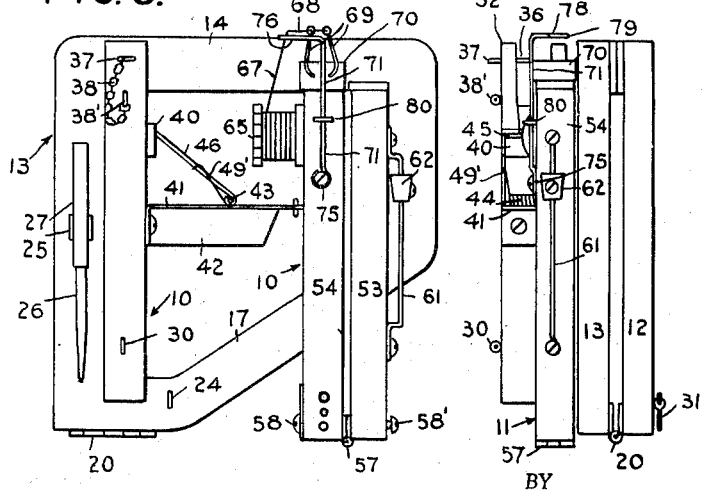
INVENTOR
WARREN D. CALVERT
BY
McMorrow, Berman & Davidson
ATTORNEYS United States Patent Office 2,773,326
Patented Dec. 11, 1956

2,773,326

FOLDABLE TILT-UP

Warren D. Calvert, Clark, S. Dak.

Application September 9, 1953, Serial No. 379,220

3 Claims. (Cl. 43—16)

This invention relates to improvements in fishing apparatus, especially but not exclusively, for fishing through holes in ice, and more particularly to an improved tilt-up device which is foldable into compact form for transportation and storage and which involves means responsive to a pull by a fish on an associated fishing line to get a hook into a fish on the line and hold the hooked fish on the line and to give visual warning of a fish hooked on the line.

The primary object of the invention is to provide a tilt-up device of the character indicated above which may take up less space than prior devices of this kind, which is more practical, reliable and efficient, is easier to use, and is capable of being made in a serviceable and attractive form of a variety of available suitable materials, at relatively low cost.

Other important objects and advantageous features of the invention will be apparent from the following description and the accompanying drawings, wherein, for purposes of illustration only, a specific form of the invention is set forth in detail.

In the drawings:

Figure 3 is a front elevation of the device with the tilt arm removed;

Figure 4 is a top plan view of the tilt arm;

Figure 5 is a side elevation of the tilt arm;

Figure 6 is a plan view of the device in folded condition; and

Figure 7 is an edge elevation looking from right to left in Figure 6.

Figure 1:
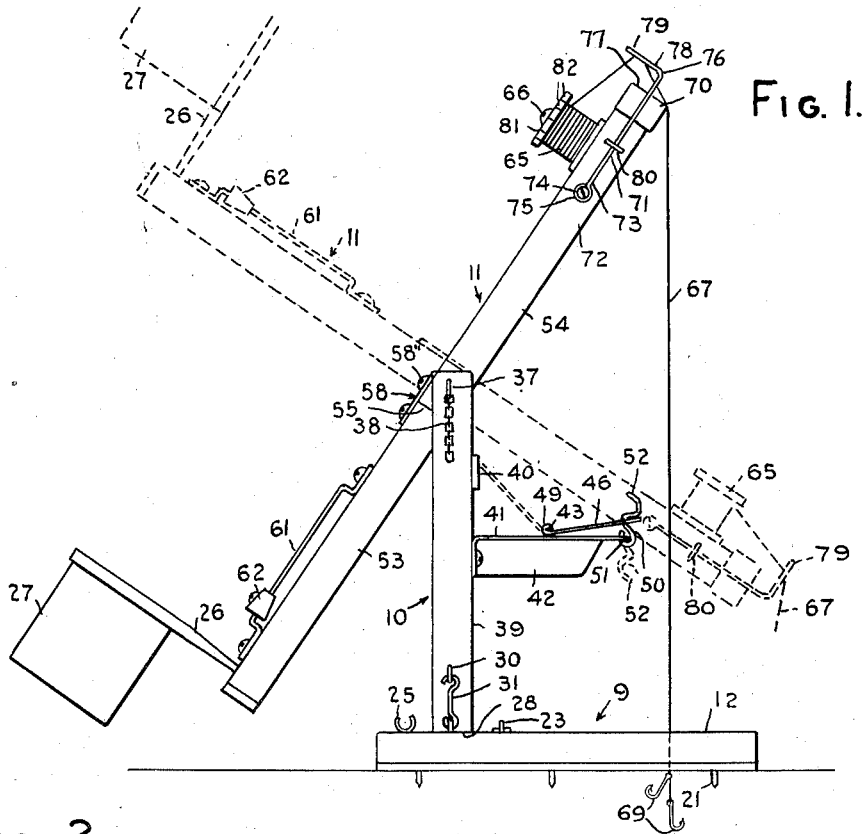
Figure 1 is a side elevation of a device according to the present invention in assembled condition, the tilt arm being shown in set position in full lines and in operated position in dotted lines.

Referring in detail to the drawings, wherein like numerals designate like parts throughout the several views, the illustrated device is composed of three principal parts or assemblies, namely, a foldable base 9, a standard 10 foldably mounted on the base 9, and a tilt arm 11 which is itself foldable and is separately mountable on the standard and can be separably connected in folded condition, to the base 9, in the folded condition of the device.

The base 9 comprises two similar flat sections 12 and 13 made of marine plywood, light weight metal, or other suitable material, these sections being coplanar in the assembled or set up condition of the device and superimposed upon each other in the folded condition of the device. Each section is an open frame comprising a rear member 14, an outer side member 15 extending forwardly from the outer end of the rear member 14, a short front member 16 extending laterally inwardly from the forward end of the outer side member 15, a diagonal inner side member 17 extending laterally inwardly and rearwardly from the inner end of the front member 16, the diagonal member 17 terminating at its inward end in a web 18 which has a straight inner edge 19 in common with the laterally inward end of the rear member 14.

The base sections 12 and 13 are disposed with the edges 19 in facing coextensive relation, and a hinge 20 secured to the under sides of the sections along the edge 19 hinges the sections together to assume either the assembled or the folded position described above.

The under surfaces of each of the sections 12 and 13 are provided with short ice gripping spikes 21, in mutually spaced relation thereon receivable in holes 22 provided in the under surface of the mutually opposite sections when the sections are folded onto each other. The sections 12 and 13 are secured in unfolded condition by a hook 23 on the upper surface of the section 12 extending across the separation of the sections which engages an eye 24 on the section 13. On the rear member 14 of the section 13 is a spring clip 25 for holding a flag staff 26 carrying a signal flag 27 when not in use.

The foldable standard 10 comprises a rectangular cross sectioned bar having a squared lower end face 28 which is adapted to rest upon and bridge the separation between the web portions 18 of the base sections 12 and 13 in the assembled or set up condition of the device. The standard is hingedly connected to the section 13 by a hinge 29 secured thereto and to the adjacent side of the standard 10. On the other side of the standard 10 is an eye 30 with which is engageable a hook 31 secured to the section 12 whereby the standard is releasably maintained in erect perpendicular position on the base 9.

Figure 2:
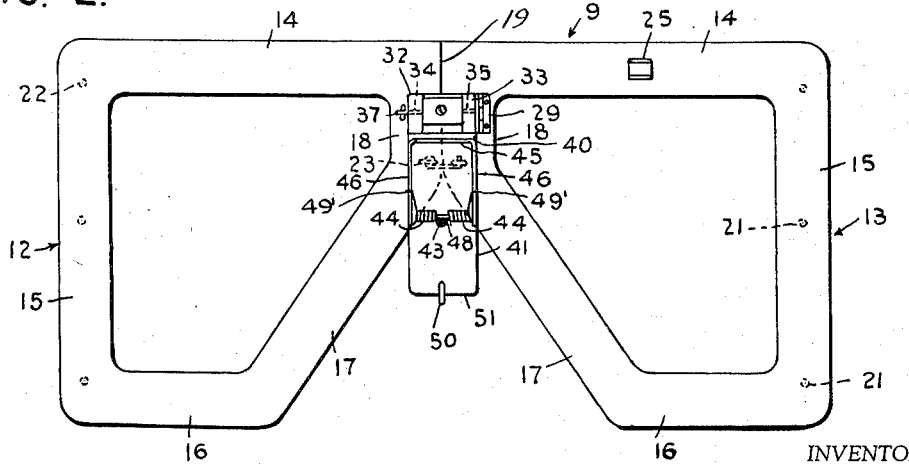
Figure 2 is a top plan view of the device of Figure 1, but with the tilt arm of the latter figure omitted.

The upper end of the standard is slotted to provide a fork having the vertical arms 32 and 33, provided with registering holes 34 and 35, respectively, for accommodating a pin 36 as shown in Figure 2. The pin 36 has an eye 37 on one end, to which one end of a safety chain 38 is connected which has its other end tethered, as indicated at 38' on a side of the standard 10.

Mounted on one side 39 of the standard 10 at a point immediately below the fork arms 32, 33 is a metal striking plate 40, and below the plate 40 there is secured a flat, forwardly extending bracket 41 having on its under side a reinforcing rib 42. Fixed at the midpoint of the bracket 41 is a "rat trap" spring assembly which comprises a pin 43 extending across and secured at its ends to the bracket 41, a pair of helical springs 44 wound on the pin, a U-shaped yoke involving a bight portion 45 and legs 46 terminating in eyes 49 circumposed on the ends of the pin 43. The springs 44 are integrally joined at their inward ends by means of a loop 48 which is secured to the bracket 41, and the outer ends of the springs 44 terminate in pressure arms 49' which bear rearwardly against the front sides of yoke legs 46. In this way the springs yieldably urge the yoke rearwardly toward the striking plate 40 on the standard for a purpose hereinafter explained. A retaining trigger hook 50 is loosely pivoted at the forward end 51 of the bracket 41 for engaging the bight portion 45 of the yoke so as to hold the yoke in a cocked and tensioned position away from striking plate 40, shown in full lines in Figure 1. The hook 50 has a lateral terminal or finger 52 for a purpose hereinafter explained.

The foldable tilt arm 11 comprises a pair of similar forward and rearward bar sections 53 and 54, respectively, which have squared inner ends 55 and 56, respectively, which are bridged and hingedly connected by a hinge 57 secured to the under surfaces of the sections. For separably securing the sections 53 and 54 in longitudinal alignment with their inner ends 55 and 56 in abutting relation, the upper surface of the section 54 has a hook 58 having one end hinged as at 58' to the section 54 and having the other end provided with a hook 58" which is releasably engageable with a screw 58''' carried by the section 53.

On the upper surface of the forward tilt arm section 53 is mounted a longitudinal rail 60 having an intermediate portion 61 spaced upwardly from the section 53 and carrying a slidable weight 62 which is arranged to be adjusted along the rail portion 61 for counterbalancing the weight of fishing line components mounted on the rear end of the rearward tilt arm section 54. The rearward section 54 has near its forward end a row of longitudinally spaced transverse bores 63 arranged for selectively receiving a pivot pin 36 whereby the tilt arm 11 is operatively mounted between the two arms 32 and 33. By selective positioning of the pin 36 in one of the bores 63, the degree of rearward overbalance of the tilt arm 11 may be adjusted, in conjunction with the adjustable weight 62.

The forward end of the rear tilt arm section 53 is provided with a socket 64 into which the staff 26 of the flag 27 is adapted to be inserted for mounting thereof on the tilt arm 11. At the rear end of the upper surface of the tilt arm section 54 there is mounted a vertical axis fishing line reel 65 which is journaled by means of a headed pin 66 fixed to the section 54. A suitable length of fishing line 67 is wound upon the reel 65 and has a free end 68 shown in Fig. 6, to which is attached a pair of fish hooks 69. A cork 70 is fixed on the forward end of the tilt arm section 54 into which the fish hooks 69 are adapted to be impaled when not in use.

A fishing line guide comprising a wire form including an elongated relatively straight portion 71 extends spacedly along the right hand side 72 of the tilt arm section 54, the portion 71 having on its forward end a laterally inwardly offset portion 73 terminating in an eye 74 secured by a fastener 75 to the side 72 of the section 54. At its rear end the arm 71 merges into a laterally inwardly directed portion 76 which extends spacedly across the rear end 77 of the cork 70 and merges into a vertical arm 78 which terminates at its upper end in an open lateral eye or loop 79 through which the fishing line 67 is trained. A lateral hook 80 projecting from the side 72 of the section 54 overlies the straight portion 71 of the line guide and prevents the line guide from being moved laterally outwardly from the side 72 to an undesirable degree, while permitting limited upward flexing of the line guide and return. The upper flange 81 of the line reel 65 has circumferentially spaced notches 82 and a clicker 83 in the form of a wire arm 84 secured at one end at 85 to a side 86 of the tilt arm section 54 engages the periphery of the end flange 81 to preclude vagrant rotation of the reel 65 in either direction.

The tilt arm section 54 overlies the terminal 52 of the trigger hook 50 on the bracket 41. With this arrangement, the hooks 69 having been baited, and the line 67 having been let down in the water with the tilt arm 11 in the tilted full line set position shown in Figure 1, when a fish takes a hook and exerts a pull on the line, the tilt arm 11 will be swung to the dotted line position shown in Figure 1. In reaching this position the tilt arm section 54 strikes the terminal 52 of the trigger hook 50 and disengages the hook 50 from the bight portion 45 of the spring urged yoke, in consequence of which the yoke in swinging toward the striking plate 40 strikes the under surface of the tilt arm section 54 and imparts to the tilt arm 10 as a whole an upward movement of sufficient amplitude and speed to set the hooks 69 in a fish. In the down-tilted position of the tilt arm 11 the elevated position of the flag 27 signals a hooked fish. A hooked fish can take more line from the reel 65 and in so doing the clicker audibly signals the fact by moving into and out of the notches 82 of the reel.

What is claimed is:

1. In a fishing device, a base, a standard rising from said base, a tilt arm having a pivotable supporting means intermediate its ends on the upper end of said standard, said tilt arm having one end upwardly inclined and the other end downwardly inclined and said supporting means being displaceable toward said other end so that the tilt arm is overbalanced in an inclined position, a reel on the one end of the tilt arm having a fishing line wound thereon and terminating in a fishhook, a bracket on said standard mounted below the upper end of the standard and beneath said one end of the tilt arm, an upwardly spring pressed yoke pivoted on said bracket adapted to swing upwardly toward the standard when released from another tensioned position, pivoted trigger means on said bracket adapted to engage said yoke to hold the yoke in a tensioned position, said trigger means including a retaining trigger hook located in the path of said tilt arm and arranged to be engaged by and released from said yoke by the tilt arm as the tilt arm is swung downwardly from its set position by a pull exerted upon the fishing line by a fish caught on a hook, whereby said yoke may be freed to swing upwardly and impart a sufficient upward movement of the tilt arm to tighten the fishing line and set the hook in the fish.

2. In a fishing device, a base, a standard rising from said base, a tilt arm having a pivotable supporting means intermediate its ends on the upper end of said standard, said tilt arm having one end upwardly inclined and the other end downwardly inclined and said supporting means being displaceable toward said other end so that the tilt arm is overbalanced in an inclined position, a reel on one end of the tilt arm having a fishing line wound thereon and terminating in a fishhook, a laterally projecting bracket on said standard mounted below the upper end of the standard and beneath the one end of the tilt arm, an upwardly spring pressed yoke pivoted on said bracket adapted to swing upwardly toward the standard when released from another tensioned position, pivoted trigger means on said bracket adapted to engage said yoke to hold the yoke in a tensioning position, said trigger means including a retaining trigger hook located in the path of said tilt arm and arranged to be engaged by and released from said yoke by the tilt arm as the tilt arm is swung downwardly from its set position by a pull exerted upon the fishing line by a fish caught on a hook, whereby said yoke may be freed to swing upwardly and impart a sufficient upward movement of the tilt arm to tighten the fishing line and set the hook in the fish.

3. In a fishing device, a base, a standard rising from said base, a tilt arm having pivotable supporting means intermediate its ends on the upper end of said standard, said tilt arm having one end upwardly inclined and the other end downwardly inclined and said supporting means being displaceable toward said other end so that the tilt arm is overbalanced in an inclined position, a reel on the one end of the tilt arm having a fishing line wound thereon and terminating in a fishhook, a bracket on said standard mounted below the upper end of the standard and beneath the one end of the tilt arm, an upwardly spring pressed yoke pivoted on said bracket adapted to swing upwardly toward the standard when released from another tensioned position, pivoted trigger means on said bracket adapted to engage said yoke to hold the yoke in a tensioned position, said trigger means including a retaining trigger hook located in the path of said tilt arm and arranged to be engaged by and released from said yoke by the tilt arm as the tilt arm is swung downwardly from its set position by a pull exerted upon the fishing line by a fish caught on a hook, whereby said yoke may be freed to swing upwardly and impart a sufficient upward movement of the tilt arm to tighten the fishing line and set the hook in the fish, and a longitudinally slidable counterbalancing weight on said tilt arm adjacent to the other end of the arm for predetermining the overbalance of the tilt arm.

References Cited in the file of this patent

UNITED STATES PATENTS

| | | |
|---|---|---|
| 252,008 | Andrews | Jan. 10, 1882 |
| 380,899 | Jones | Apr. 10, 1888 |
| 434,426 | Costellow | Aug. 19, 1890 |
| 480,346 | Ruetter | Aug. 9, 1892 |
| 983,013 | Wright | Jan. 31, 1911 |
| 1,486,169 | Trautschold | Mar. 11, 1924 |
| 1,610,534 | Rice | Dec. 14, 1926 |
| 1,863,756 | Lurkin | June 21, 1932 |
| 2,008,555 | Kovane | July 16, 1935 |
| 2,136,864 | Paquette | Nov. 15, 1938 |
| 2,636,303 | Feigley et al. | Apr. 28, 1953 |
| 2,653,405 | Monahan | Sept. 29, 1953 |
| 2,663,962 | King | Dec. 29, 1953 |